United States Patent [19]

Takahashi

[11] 4,185,936
[45] Jan. 29, 1980

[54] LOCKING DEVICE IN A TELESCOPIC TRIPOD LEG ASSEMBLY

[75] Inventor: Shoichiro Takahashi, Yokohama, Japan

[73] Assignee: Kenlock Corporation, Yokohama, Japan

[21] Appl. No.: 928,782

[22] Filed: Jul. 28, 1978

[30] Foreign Application Priority Data

Aug. 5, 1977 [JP] Japan .......................... 52/104325[U]

[51] Int. Cl.² .............................................. F16B 7/18
[52] U.S. Cl. ................................... 403/104; 248/188.5
[58] Field of Search ................................ 403/104, 374; 248/188.5, 412, 413

[56] References Cited

U.S. PATENT DOCUMENTS

| | | | |
|---|---|---|---|
| 2,817,548 | 12/1957 | Uthemann | 403/104 |
| 2,927,757 | 3/1960 | Omohundro et al. | 248/413 |
| 3,453,011 | 7/1969 | Meinunger | 403/104 |
| 3,589,757 | 6/1971 | Mooney | 248/188.5 X |
| 4,029,279 | 6/1977 | Nakatani | 248/188.5 |

FOREIGN PATENT DOCUMENTS 1132737  7/1962  Fed. Rep. of Germany ........ 248/188.5

*Primary Examiner*—Andrew V. Kundrat

[57] ABSTRACT

A locking device in a telescopic tripod leg assembly comprising at least two leg elements, for releasably fixing one of two inner and outer leg elements relative to the other in an extended position of the tripod leg assembly. An outer leg element and a frame secured thereto are provided in their walls with an aligned through-opening, and a locking lever having a cam portion at its end is pivotally connected to the frame so that the cam portion is positioned within the aligned through-opening. A pressure piece is placed on the wall of the inner leg element within the through-opening and a spring piece is supported on projections at both sides of the pressure piece. When the locking lever is pivotally moved downward, the spring piece is pressed by the cam portion thereof and curved into a groove between the projections, whereby the inner leg element can be positively fixed relative to the outer leg element by the elasticity of the spring piece.

3 Claims, 3 Drawing Figures

LOCKING DEVICE IN A TELESCOPIC TRIPOD LEG ASSEMBLY

List of Prior Art References (37 CFR 1.56(a))
The following reference is cited to show the state of the art:
Japanese Utility Model Publication Sho-50-32132

BACKGROUND OF THE INVENTION

This invention relates to a locking device in a telescopic tripod leg assembly comprising at least two leg elements, for releasably fixing one of the leg elements relative to the other in an extended position of the tripod leg assembly.

In a conventional type of tripod, locking operation of a locking device was effected by pivotally moving a lever mounted on a frame secured to one of two tripod leg elements and strongly pressing a cam at the end of the lever directly against the other of the tripod leg elements. However, such locking device required extremely strong force for locking and unlocking operation of the lever, and after locking it often loosened due to the slight wear of the contact surface thereof and could not fully fulfil its function.

SUMMARY OF THE INVENTION

It is therefore one object of the invention to eliminate the above-mentioned disadvantages and to provide a locking device in a telescopic tripod assembly which is considerably easy to operate a lever for locking and unlocking of the leg elements and ensures reliable locking of the leg elements.

According to the present invention, there may be provided a locking device in a telescopic tripod leg assembly at least two inner and outer leg elements, comprising an opening formed in the wall of said outer leg element, a frame fixedly secured to said outer leg element and having an opening forming an aligned through-opening together with said opening of the outer leg element; a locking lever having a cam at its one end and pivotally connected to said frame so that the cam is positioned within said aligned through-opening; a pressure piece disposed on the wall of said inner leg element, said pressure piece having projections at both opposed sides thereof; and a a messenger spring piece supported by said projections so that it may be strained, said spring piece disposed in said aligned throughopening in adjacent relation to the cam of said locking lever.

BRIEF DESCRIPTION OF THE DRAWINGS

The foregoing and other objects, features and advantages of the invention will become more apparent upon a reading of the following detailed specification and drawing, in which.

DETAILED DESCRIPTION

Figure 1:
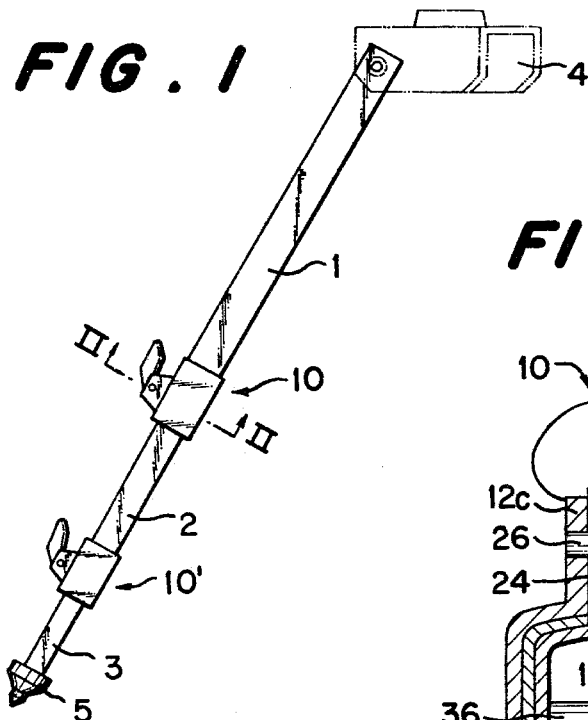
FIG. 1 is a general view of a telescopic tripod leg assembly comprising three leg elements and two locking devices.

Referring to FIG. 1, a telescopic tripod leg assembly comprises three leg elements 1, 2 and 3, and two locking devices 10 and 10' which serve to releasably lock the leg elements 1 and 2 and the leg elements 2 and 3, respectively. Reference numeral 4 indicates a tripod socket and 5 a leg point.

Figure 2:
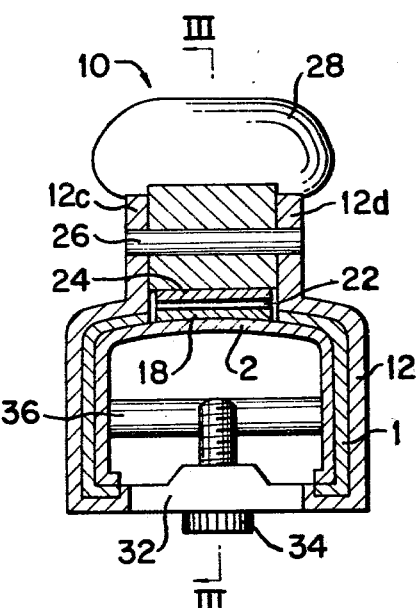
FIG. 2 is a cross-sectional view of the locking device taken along the line II—II of FIG. 1.
Figure 3:
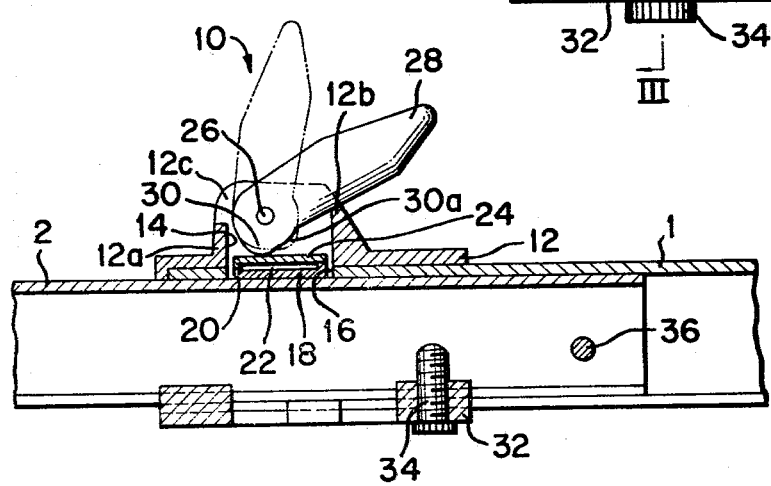
FIG. 3 is a fragmentary longitudinal sectional view of the locking device taken along the line III—III of FIG. 2.

Referring to FIGS. 2 and 3, the leg element 2 having □-shaped cross-section is slidably fitted in the leg element 1 of □-shaped cross-section. As the locking devices 10 and 10' are same in construction, only one of them will be explained.

In FIG. 3, a frame 12 is firmly mounted on an end of the leg element 1 by a suitable means such as calking. On the upper wall of the frame 12, an opening 14 having a cross-section of square configuration is formed and enclosed by one pair of opposed side walls 12a and 12b and another pair of opposed ear portions 12c and 12d. At the same time, an opening 16 is provided in the wall of the leg element 1 to form an aligned through-hole together with the opening 14 of the frame 12. A pressure piece 18 is loosely inserted in the opening 16 of the leg element 1 and placed on the wall of the leg element 2. As seen from FIG. 2, the pressure piece 18 has an arched concave lower surface which corresponds to the arched convex surface of the leg element 1. Further, the pressure piece 18 is formed at the back surface opposite to the arched surface with elongated projections 20 extending upwardly from both side edges thereof perpendicular to the longitudinal axis of the leg element 1 as seen from FIG. 3 to form a groove 22 therebetween. Preferably, the pressure piece 18 is made of plastic material having elasticity to a certain degree to prevent any damage to the leg elements. Similarly, a spring piece 24 of material such as spring steel is loosely inserted in the opening 14 and placed on both elongated projections 20 of the pressure piece 18.

A locking lever 28 is pivotally connected to the both ear portions 12c, 12d by a pin 26. The locking lever 28 is integrally formed at its one end with a cam 30 having an acting portion 30a which is longer in radial distance from the axis of the pin 26. In FIG. 3, the locking lever 28 is pivotally connected to the frame 12 such that the acting portion 30a of the cam 30 is spaced from the spring piece 24 in the unlocked position of the lever 28 indicated with a two-dot chain line in FIG. 3, while in the locked position of the lever 28 indicated with a full line where the acting portion 30a is pressed against the spring piece 24 with the lever 28 being in abutting engagement with the upper edge of the side wall 12b, the contact line or surface of the acting portion 30a with the spring piece 24 is positioned at the left of a perpendicular dropped from the axis of the pin 26 onto the spring piece 24. Accordingly, the cam 30 and the spring piece 24 are kept in position engaged with each other so long as force is not applied to the locking lever 28 to some degree. Practically, a satisfactory result was obtained by pressing the spring piece 24 through the cam 30 of the lever 28 to such a degree that it is deflected approximately 0.2 mm into the groove 22 of the pressure piece 18.

Both depending walls of the frame 12 are connected at their lower ends by two reinforcing arms 32. A bolt 34 is screwed in one of the reinforcing arms 32 and is adapted to engage a pin 36 connecting two depending walls of the leg element 2 so that the leg element 2 is prevented from falling off the leg element 1.

In assembling the locking device according to the invention, before inserting the leg element 2 into the leg element 1; the spring piece 24 and the pressure piece 18 are inserted in this order through the interior of the leg element 1 into the aligned opening 14, 16 with the lever 28 directed downward, and placed on the peripheral surface of the cam 30. Then, after loosening the bolt 34, the leg element 2 is inserted into the leg element 1 and the bolt 34 is tightened again.

In operation, one slides the leg element 2 relative to the leg element 1 to a desired extended position and the locking lever 28 is pivotally moved downward until it is brought into engagement with the upper edge of the side wall 12b of the frame 12, whereby the leg elements 1 and 2 are fixed against each other. Unlocking operation of the lever 28 may be effected by pivotally moving upward to the position as shown with two dot chain line in FIG. 3.

Thus, unlike the conventional method of pressing a cam surface of a lever directly against a leg element, the locking device according to the present invention utilizes effectively the elasticity of the spring piece to fix one of the leg elements with respect to the other, so that the positive locking force may be obtained with a considerable small deflection of the spring piece and the locking and unlocking operation of the lever can be easily effected by relatively small force. Furthermore, as a leg element is pressed through the pressure piece of plastic material, no damage is given to the leg element.

In addition, all the locking devices of a tripod can be locked by substantially equal force.

What is claimed is:

1. A locking device in a telescopic tripod leg assembly comprising at least two inner and outer leg elements, for releasably fixing one of the leg elements relative to the other in an extended position of said tripod leg assembly, comprising an opening formed in the wall of said outer leg element; a frame fixedly secured to said outer leg element and having an opening forming an aligned through-opening together with said opening of the outer leg element; a locking lever having a cam at its one end and pivotally connected to said frame so that the cam is positioned within said aligned through-opening; a pressure piece disposed on the wall of said inner leg element, said pressure piece having projections at both opposed sides thereof; and a spring piece supported by said projections so that it may be strained, said spring piece disposed in said aligned through-opening in adjacent relation to the cam of said locking lever.

2. A locking device as set forth in claim 1, wherein said pressure piece is made of plastic material.

3. A locking device as set forth in claim 1, wherein said spring piece is made of spring steel.

* * * * *

UNITED STATES PATENT AND TRADEMARK OFFICE
CERTIFICATE OF CORRECTION

PATENT NO. : 4,185,936
DATED : January 29, 1980
INVENTOR(S) : Shoichiro Takahashi It is certified that error appears in the above–identified patent and that said Letters Patent are hereby corrected as shown below:

Column 2, line 6, " ☐ " should be -- ⌐ --;
Column 2, line 7, " ☐ " should be -- ⌐ --.

Signed and Sealed this

Twenty-second Day of July 1980

[SEAL]

Attest:

SIDNEY A. DIAMOND

Attesting Officer     *Commissioner of Patents and Trademarks*